(12) United States Patent
Giacalone et al.

(10) Patent No.: US 6,272,624 B1
(45) Date of Patent: Aug. 7, 2001

(54) METHOD AND APPARATUS FOR PREDICTING MULTIPLE CONDITIONAL BRANCHES

(75) Inventors: Glenn P. Giacalone, Westford; John H. Edmondson, Arlington, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/285,529

(22) Filed: Apr. 2, 1999

(51) Int. Cl.$^7$ .............................. G06F 9/305; G06F 9/42; G06F 9/38
(52) U.S. Cl. .......................... 712/239; 712/240; 711/216; 711/206
(58) Field of Search .................................... 712/239, 240, 712/206, 207, 237, 236, 235, 233, 234, 238, 224, 223, 202, 226, 203; 711/204, 216, 114

(56) References Cited

U.S. PATENT DOCUMENTS 5,822,577 * 10/1998 Ekanndham et al. ................... 712/24
6,092,187 * 7/2000 Killian ................................. 712/239

OTHER PUBLICATIONS

Lee, C–C. et al., "The Bi–Mode Branch Predictor," to appear in Micro–30, 1997.

Yeh, T–Y. and Patt, Y.N., "Two–Level Adaptive Training Branch Prediction," Proceedings of the 24th International Symposium on Microarchitecture, pp. 51–61, Nov. 1991.

Yeh, T–Y., Marr, D.T. and Patt, Y.N., "Increasing the Instruction Fetch Rate via Multiple Branch Prediction and a Branch Address Cache," The 7th ACM International Conference on Supercomputing, pp. 67–76, Jul. 19–23, 1993, Tokyo, Japan.

Dutta, S. and Franklin, M., "Block–Level Prediction for Wide–Issue Superscalar Processors," in 1995 IEEE, pp. 143–152.

McFarling, S., "Combining Branch Predictors," WRL Technical Note TN–36, Digital Equipment Corporation, Jun. 1993.

Dutta, S. and Franklin, M., "Control Flow Prediction with Tree–Like Subgraphs for Superscalar Processors" Proc. 28th International Symposium on Microarchitecture, pp. 253–263, 1995.

Michaud, P. et al., "Trading Conflict and Capacity Aliasing in Conditional Branch Predictors," Proceedings of the 24th Annual International Symposium on Computer Architecture, pp. 2–13, Jun. 1995.

\* cited by examiner

Primary Examiner—Daniel H. Pan
(74) Attorney, Agent, or Firm—Hamilton, Brook, Smith & Reynolds, P.C.

(57) ABSTRACT

The outcome of a plurality of branch instructions in a computer program is predicted by fetching a plurality or group of instructions in a given slot, along with a corresponding prediction. A group global history (gghist) is maintained to indicate of recent program control flow. In addition, a predictor table comprising a plurality of predictions, preferably saturating counters. A particular counter is updated when a branch is encountered. The particular counter is associated with a branch instruction by hashing the fetched instruction group's program counter (PC) with the gghist. To predict multiple branch instruction outcomes, the gghist is hashed with the PC to form an index which is used to access naturally aligned but randomly ordered predictions in the predictor table, which are then reordered based on value of the lower gghits bits. Preferably, instructions are fetched in blocks of eight instructions. The gghist is maintained by shifting in a 1 if a branch in the corresponding group is taken, or a 0 if no branch in the corresponding group is taken. The hashing function is preferably an XOR operation. Preferably, a predictor table counter is incremented when a corresponding branch is taken, but not beyond a maximum value, and is decremented when the corresponding branch is not taken, but not below zero. Preferably, the most significant bit of a counter is used to determine a prediction.

26 Claims, 10 Drawing Sheets

METHOD AND APPARATUS FOR PREDICTING MULTIPLE CONDITIONAL BRANCHES

BACKGROUND OF THE INVENTION

With the goal of making computers faster and more powerful, many techniques are being developed to execute a microprocessor's resources in parallel and as efficiently as possible. For instance, while microprocessors have, in the past, typically executed a single instruction at a time, modem super-scalar processors execute multiple instructions in a single cycle. To efficiently supply enough instructions to execute simultaneously, multiple instructions are fetched in a single fetch cycle. Due to the pipelined nature of such a microprocessor, it is often necessary to fetch instructions before some conditional branch instruction has executed, where that branch instruction may change the control flow such that the fetched instructions are the wrong instructions to execute. This presents a waste in memory access bandwidth, latency, processing and re-access time.

Research has shown that the outcome of conditional branches can be predicted with a high degree of accuracy based on past behavior. With such a prediction, a much more efficient use of memory-access bandwidth and faster execution can be achieved.

For example, Yeh and Patt, "Two-Level Adaptive Branch Prediction", The 24th ACM/IEEE International Symposium and Workshop on Microarchitecture, (November 1991), pp. 51–61, developed a global history (ghist) branch predictor in 1991 as a generalization of their two-level branch prediction scheme. Based on a pattern of past branch taken/not taken decisions, independent of instruction address, a prediction of a next decision is made. The ghist scheme maintains a shift register whose bits represent taken/not-taken results of previous conditional branches in an instruction sequence. The next decision for a particular pattern is indicated by a value indexed by the shift register. The values are obtained by incrementing and decrementing individual counters associated with the pattern based on decisions already made.

Predictions are stored in n-bit saturating counters, where n is typically two, and an array of n-bit saturating counters is indexed by the ghist shift register. Thus, based on the history in the ghist shift register, an indexed counter is used to predict whether a branch is taken or not taken. Typically, a threshold is used to determine the prediction. For example, if a counter's value is above the threshold, a branch may be predicted as taken. If the counter value is below the threshold, the branch is predicted as not taken. If the threshold is one half of the full range of the counter, this may be simplified by using the most significant bit of the counter as the prediction indicator. Alternatively, various forms of hysteresis have been used or proposed. Regardless of the exact method used, the bit-pattern in the shift register has been found to accurately predict which branch is taken.

Yeh and Patt, "Increasing the Instruction Fetch Rate via Multiple Branch Prediction and a Branch Address Cache", Proceedings of the 7th ACM International Conference on Supercomputing, July 1993, extended this work to allow multiple branch predictions to occur almost in parallel. The described branch predictor counter array, or pattern history table, is multi-ported, having seven read ports for three predictions. Two multiplexors (one 2:1, and one 4:1) are required after the arrays to choose the correct predictions. The multiplexor controls are serial, that is, the output of the first is a control input for the second. The capacity of the predictor is limited due to the need to have seven read ports.

McFarling, "Combining Branch Predictors", WRL Technical Note TN-36, Digital Equipment Corporation, June 1993, extends Yeh and Patt's ghist work by hashing the contents of the global history register with the address of the branch instruction to compute the index into the counter table. This scheme is called "gshare" and it improves the accuracy of the predictions.

Dutta and Franklin, "Block-Level Prediction for Wide-Issue Superscalar Processors," Proc. Ist International Conference on Algorithms and Architectures for Parallel Processing, pp. 143–152, April 1995, and "Control Flow Prediction with Tree-Like Subgraphs for Superscalar Processor," Proc. 28th International Symposium on Microarchitecture, pp. 253–263, 1995 also recognized the need to perform multiple branch predictions in a cycle. They perform "block prediction" in which they determine which branch in a group of fetched instructions will be taken, and predict the target address using "block history". There appear to be two limitations to this scheme. First, although the branch predictor must be able to begin a new access every cycle in order to maintain a fully populated pipeline, two array accesses are required in series which may limit the repeat rate of the predictor. Second, the latency of the predictor is at least two full cycles due to the series array structure.

This research presents a problem in designing a very wide issue superscalar processor. In order to achieve high-performance, many branch predictions must be predicted per cycle. However, the state of the branch predictor must be large to be able to accurately predict the branches of complex programs, and the machine must be buildable and operate at a high frequency. The above schemes suggest either series arrays or arrays with a large number of ports.

SUMMARY OF THE INVENTION

In accordance with a preferred embodiment of the invention, a system for predicting branch outcome comprises:
- a register which provides a pattern of program control flow, wherein the register is modified based on a summary of control flow activity of a group of instructions fetched in a given slot;
- a hash function which generates an index, by hashing the register's value with the group's program counter (PC) where outcomes of branch instructions within the group are to be predicted;
- an array of branch predictions, which, when referenced by the generated index, provides naturally aligned branch predictions; and
- a shuffler for reordering the provided branch predictions based on a portion of the register, into the same order as instructions.

The preferred embodiment addresses the problems discussed above. For n sequential instructions fetched, n branch predictions are made with one read port on the predictor array. The single read port allows the predictor to have a large amount of state. Two key concepts are group global history (gghist) and storing the branch predictions sequentially.

In the prior art, if a group of fetched instructions has a number of conditional branches in it, the branch predictor must be queried for each branch. Ghist branch predictors work well because the pattern in the shift register identifies the current execution point in the control flow graph of the program. In fact, given a program of sufficient length, predictor accuracy may be roughly proportional to the length of the ghist register.

A problem of the serial nature of making multiple predictions with a global history predictor, where a conditional branch prediction depends upon the last prediction made, thereby creating a critical loop, is overcome by the present invention. In solving this problem, a key observation is that for a group of sequential instructions, all that matters in constructing the global history is whether or not the group contains a predicted taken branch. For example, in a machine that fetches four instructions per cycle, assume the following instructions are fetched:

add
    branch
    compare
    branch and that the first branch is predicted to be not-taken and the second is predicted to be taken. In a conventional ghist scheme, "01" is shifted onto the ghist register. The rules for conventional ghist are:

for each conditional branch
      if (branch is taken)
        then shift 1 into ghist register
        else shift 0 into ghist register
    end In the present invention, on the other hand, only a 1 is shifted into the history register. The rile for the present invention is:

for each group of fetched instructions
      if (there is a taken conditional branch)
        then shift 1 into gghist register
        else shift 0 into gghist register
    end We call this a "group" global history (gghist) and have found that it produces a predictor with virtually the same accuracy as one with conventional ghist. Gghist provides the ability to design a branch predictor which does not depend on the number of branches in a sequentially fetched group of instructions, but rather depends on whether or not there is a taken branch in that group. Therefore, all of the predictions for a group are determined in parallel because the gghist does not need intermediate results.

A second problem overcome by the present invention is that of making multiple predictions without multiple read ports on the predictor array. A preferred embodiment of the present invention stores branch predictions, which correspond to sequential instructions, in a sequential fashion. For example, an architecture in which the branch prediction is chosen based upon instruction address has predictions corresponding to sequential instructions stored sequentially, because both the memory, or cache, and branch predictor are accessed using instruction address. Global history-based predictions are different in that the address is not used to access the prediction array. The location of the actual prediction depends not upon the instruction address but upon the taken/not-taken history of previous branches. Therefore, sequential instructions could have their predictions in seemingly random places in the prediction array.

To store sequential instructions' predictions sequentially, a predictor scheme must be based in at least some part on the instruction address. Therefore, a preferred embodiment of the present invention employs a predictor similar to that used by gshare. Preferably, the full history register of length g is hashed with g bits of group address to form the index into the prediction array, where the group address is the address of the first instruction of the group. The resulting index comprises g–m bits, where m=$\log_2$n and n is the number of instructions fetched, and is used to access the predictor. Thus, n predictions, corresponding to the n fetched instructions, are read from the branch predictor.

Unlike Yeh and Patt, the predictions of the present invention are not serially dependent and the actual number of predictions can be up to n, where n is arbitrarily large. In addition, these n predictions are accomplished with one read port which is important to branch predictor capacity, as noted earlier.

Note that by using only g–m bits in the index, the m most recent gghist bits are dropped. The reason for dropping these bits in the preferred embodiment is that the computer architecture in which it is employed is pipelined, such that the m most recent bits may not be available in time to access the array.

However, the history information contained in these bits is very important to branch predictor accuracy and should therefore be taken into account. Thus, a "shuffle network" reorganizes the n predictions using the least significant m bits of the gghist register. The choice of not including the most recent history bits in the indexing but using them to control the shuffle is made of necessity due to the pipelined architecture.

In accordance with the present invention, a method of branch prediction comprises maintaining a local global history (gghist) register which provides a pattern of program control flow. The register is modified or updated based on a summary of control flow activity of a group of instructions fetched in a given slot. For example, the value of a bit shifted into the register may depend on whether any branch instruction in the group fetched in the current slot was taken. Preferably, the modification is based on whether, after an entry point, a branch within the group is taken. For example, a 1 is shifted into the gghist register if any branch in the corresponding group of instructions is taken, or a 0 if no branch in the corresponding group is taken.

An index may be generated by hashing the register's value with the program counter (PC) of the fetched group, where that branch instruction's outcome is to be predicted. Preferably, the hash function is a simple XOR of the gghist history register with the PC.

In an embodiment where n instructions are fetched per slot, the index comprises g–m bits, where m=$\log_2$n, and is used to access n naturally aligned but shuffled branch predictions. The branch predictions are then reordered based on the least significant m bits of the gghist register, into the same order as the instructions, such that there is an ordered one-to-one correspondence between instruction and prediction. In a preferred embodiment, eight instructions are fetched per slot, i.e., n=8 and m=3.

Where a branch instruction is predicted to be taken, its target address is used to fetch the next group of n instructions. The least significant bits of the target address indicate the execution entry point for the group and the next set of predictors is scanned from that point. On the other hand, where no branch is predicted to be taken, the next sequential group of n instructions is fetched.

Preferably, the predictions are generated by maintaining a plurality of saturating counters in a predictor table. A particular prediction counter is updated when a branch is encountered. The prediction counter is referenced by the hash, using the same hash function as described above, of the group's PC and the gghist history register. A counter is incremented when a corresponding branch is taken, but not beyond a maximum value, and is decremented when the corresponding branch is not taken. The counter is not decremented below zero. Preferably, the most significant bit of a counter is used to determine the prediction.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

When a conditional branch is encountered, the control path has two choices: either the branch is taken (T), or the branch is not taken (NT). In a computer processor which may execute instructions speculatively and out of program order, it is important to be able to predict with confidence the outcome of a conditional branch instruction. Examples of typical conditional branches are, branch if greater than (BGT), branch if equal (BEQ) and so on.

Figure 1:
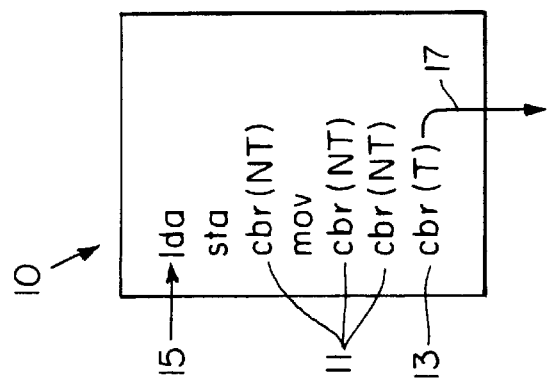
FIG. 1 is a block diagram illustrating a basic block of code.

FIG. 1 demonstrates a basic block 10 of code. The entry point is indicated by arrow 15. There are several conditional branch (cbr) instructions 11, 13. The first three cbr instructions 11 are not taken, so that the program flow continues sequentially through the block. Finally, cbr instruction 13 is encountered, and the branch is taken as indicated by arrow 17. Sequential control flow is broken, and thus instruction 13 is the last instruction of the basic block 10.

A representative system in which the present invention is employed comprises an instruction box (IBox) as the first part of an instruction pipeline. One of the major responsibilities of the IBox is predicting program control path flow. The IBox may implement advanced control path predictors including a line predictor, as well as a conditional branch predictor that can predict many branches each cycle.

In a preferred embodiment, there are two fetch slots per processor clock cycle, and up to eight naturally aligned instructions are fetched per slot, for a total of sixteen instructions fetched per cycle. Each set of eight fetched instructions corresponding to a slot is referred to as a fetch group. In a preferred embodiment, each processor clock cycle has two phases, and each phase comprises a fetch slot. Of course, a clock cycle could also comprise more than two fetch slots. In an alternate embodiment, multiple slots of instructions may be fetched concurrently. In addition, these two fetching techniques can be combined.

Although instructions are fetched speculatively, it is the IBox's task to deliver as many good instructions to an instruction scheduler per cycle as possible, that is, instructions which are in a correctly speculated path. The IBox may issue up to eight instructions per cycle. Hindering this effort is the fact that basic block length on some programs is very short, on the order of three to four instructions in some cases.

First generation speculative execution, out-of-order, super-scalar processors have the ability to issue at most one basic block to the scheduler. To implement such a scheme, a new basic block address must be generated simultaneously with the information needed to generate the next basic block address.

Aggressive branch predictors have a latency of greater than one cycle to compute taken branch targets, and therefore a separate, fast but simple line predictor may be used which uses an instruction cache index to index a structure, namely a line predictor that contains other Icache indices.

Clearly, even with perfect control flow prediction, a limit of one basic block issuing per cycle limits the instructions per cycle of the processor to the basic block length rather than the width of the processor. Therefore, the processor must have the ability to issue more than one basic block per cycle. A preferred embodiment of the present invention issues two basic instruction blocks per cycle.

During a read operation, the lower five bits 4:0 of the read address are ignored. Bits 4:2, which give the start instruction address within the naturally aligned instructions fetched from the cache, are used by the collapsing buffer, described later.

Figure 2A:
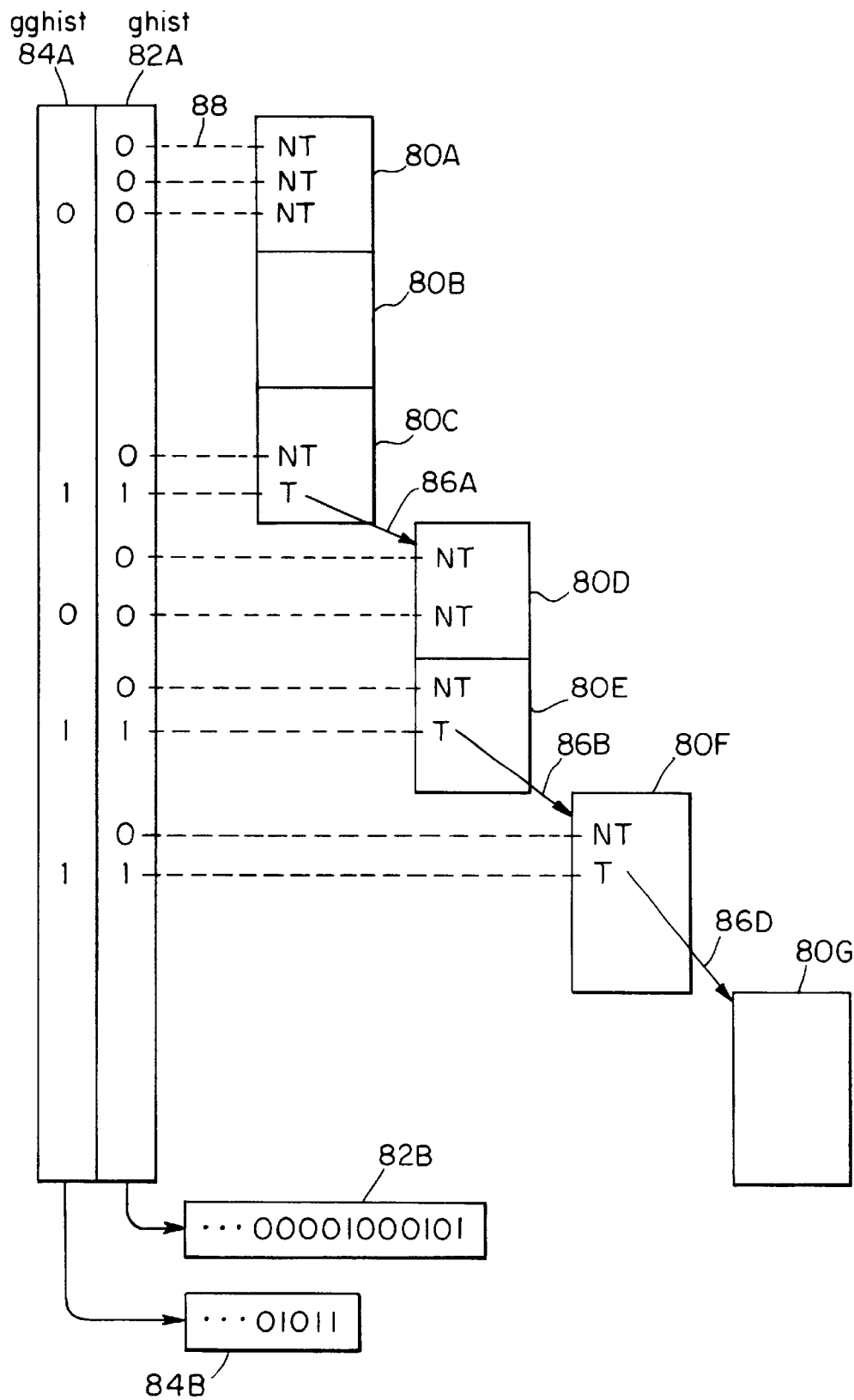
FIG. 2A is a control flow graph illustrating the flow of execution control through some program code.
Figure 2B:
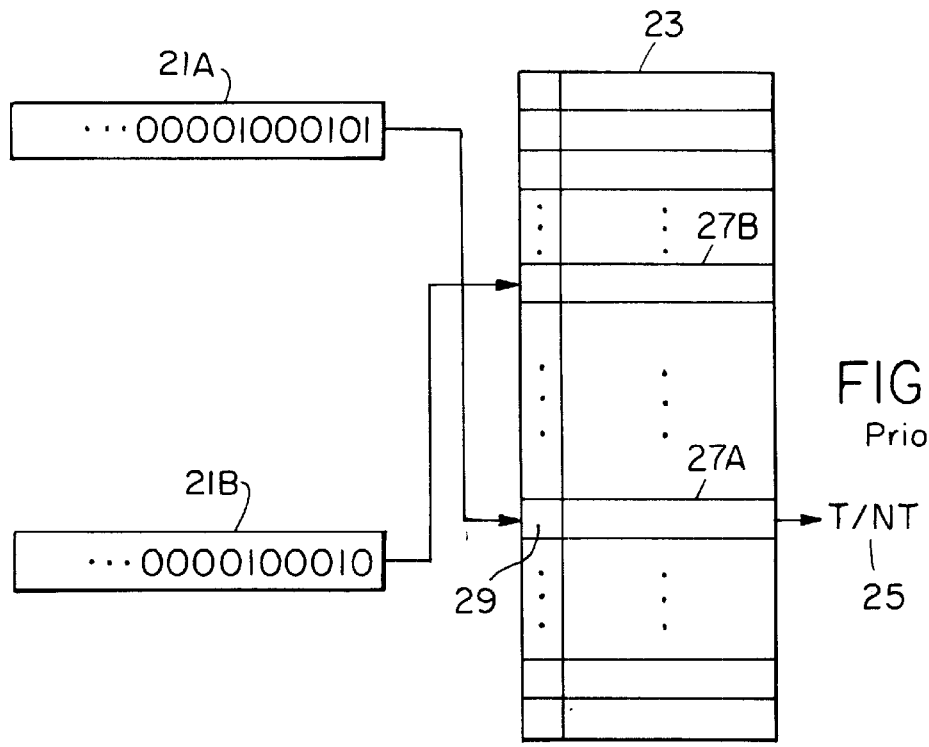
FIG. 2B is a schematic diagram illustrating a prior art ghist scheme.

FIGS. 2A and 2B demonstrate the traditional global history, or ghist, algorithm for predicting whether a branch will be taken or not taken. In FIG. 2A, blocks of code are represented as boxes 80A–80G. While there are many instructions within each block, only outcomes of branch instructions, N for taken, and NT for not taken, are shown within the blocks. For example, block 80A has three branch instructions, none of whose branches are taken. Therefore, program control flows to the next sequential block 80B, which has no branches.

Program control flows to the next sequential block 80C, which has two branches. The first is not taken, however the second is. Thus, program control flows to the target block 80D and the sequential flow is broken, as indicated by arrow 86A.

In general, flow is sequential until a branch is taken, at which point, as arrows 86A–86D indicate, the sequential flow is broken.

Column 82A represents bits as they are shifted into the ghist history register. Each time a branch is encountered that is not taken, a 0 is shifted into the ghist register. For example, all three branches in block 80A are not taken. Therefore, three 0s corresponding to the three not-taken branches, as indicated by broken lines 88, are shifted into the ghist register. Where a branch is taken, a 1 is shifted into the ghist register.

By the time block 80G is executing, the ghist register contains the pattern of 0s and 1s shown at 82B.

FIG. 2B shows how this pattern is used as an index 21A into an array 23 of branch predictions. When a branch is encountered, the current value of the ghist register 21A indexes the prediction array 23. In a preferred embodiment, each prediction in array 23, for example prediction 27A, is a counter which is incremented if the branch is taken, and decremented if the branch is not taken. These are saturating counters, so they do not increment beyond the maximum value or decrement below zero.

Previous to the last branch, the ghist history register would have appeared as shown at 21B. Notice that the register now points to a different counter 27B which is not necessarily (and likely is not) contiguous or even near counter 27A, even though the two counters 27A, 27B represent predictions for sequential branch instructions. Thus, accessing eight predictions (one per instruction in a fetch group) requires eight separate reads.

Now, when a conditional branch instruction's outcome must be predicted, the current value of the ghist register 21A is again used to index into the prediction array 23. Typically, the most significant bit 29 of the indexed counter 27A provides a prediction 25 as to whether the branch will be taken or not. For example, a 0 may predict that the branch will not be taken, while a 1 predicts that the branch will be taken.

The global history of branches is thus based upon the result of each executed branch. If there are six branches in the two fetched groups of instructions, then six new bits are shifted into the traditional ghist register. This implies that the latest ghist bit should be used as part of the prediction index in the same cycle, creating a critical loop. This thinking places the design between two difficult constraints: the identification of the location of the branches within the fetch groups; and a critical loop formed by the requirement that the identification be done within one cycle.

The present invention "local global history" (gghist) resolves these issues by allowing the branch predictor arrays to have only two read ports while the indices for those ports are easily discernible, and does not have a critical loop problem. The present invention's gghist may be thought of as a summary ghist across a fetch group. If all of the branches in the group are predicted to be not-taken, then a 0 is shifted into the gghist. If there is a predicted taken branch, then a 1 is shifted into the gghist, no matter how many predicted not taken branches precede it. If there are no conditional branches, no shifting occurs.

Referring back to FIG. 2A, column 84A shows 0s and 1s being shifted into the gghist history register according to the present invention. For example, although there are three branches in block 80A, all are predicted to be not-taken, so a single 0 is shifted into the gghist register. Since there are no branches in block 80B, nothing is shifted into the gghist register.

Although block 80C has one branch which is predicted to be not taken, it also has one branch which is predicted to be taken, and so a 1 is shifted into the gghist register. By the time block 80G is executing, the gghist register contains the pattern of 0s and 1s shown in 84B. Note how only five bits have been shifted into the gghist register, while for the same flow of execution (blocks 80A–80G), eleven bits would have been shifted into a ghist register.

Note, however, that it is not the case that the gghist scheme of the present invention is able to maintain a comparable history with ghist using fewer bits. Since each gghist bit represents one or more ghist bits, gghist may appear to contain more information in fewer bits than ghist. Clearly though, some information is lost because there are many different combinations of taken/not-taken patterns that result in identical gghist patterns while they would have produced different ghist patterns. In effect, many branch history patterns alias to the same history.

Because of this aliasing effect, gghist contains no more information per bit. That is, to get the same accuracy, the same number of bits is needed in constructing the index, regardless of how many branches are represented by the ghist or gghist bits. In other words, gghist does not hold more information per bit about the history of branching than ghist, but rather simply holds different information. Thus, there is no particular benefit from using gghist over ghist in prediction effectiveness. Instead, the advantage of gghist lies in the elimination of serial dependence within an instruction group.

Figure 2C:
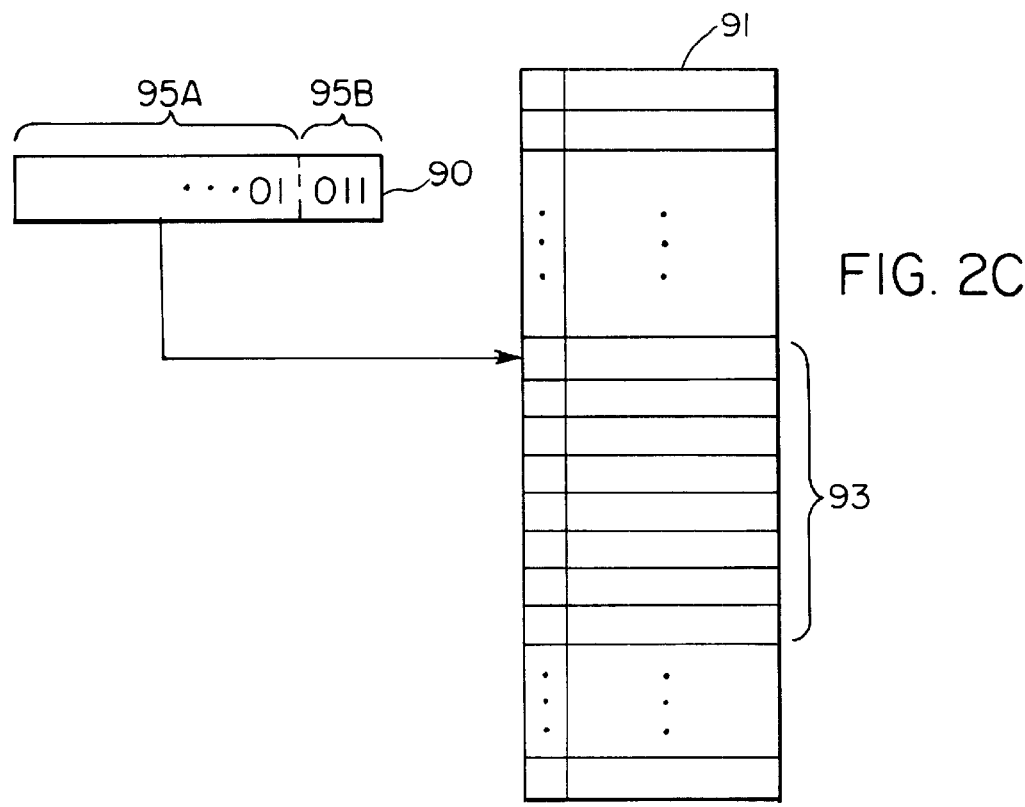
FIG. 2C is a high level schematic diagram illustrating the gghist scheme of the present invention

FIG. 2C shows that the most significant portion 95A of the gghist history register 90 is used to index into the prediction table, or array 91. Predictions associated with a fetch group are stored contiguously, so the gghist history register index 95A accesses eight predictions 93, corresponding to the fetched instructions, at one time, with one port. However, the predictions may not be in the correct order. The least significant bits 95B of the history register 90 are used later to order the predictions.

Each line prediction reads eight instructions from the cache using its prediction, and furthermore, reads eight branch predictions from the branch predictor using a gghist index. The instructions and predictions are driven to the collapsing buffer, discussed below, where the start location, as indicated by bits 4:2 of the target address, and any taken branch are taken into account. The branch predictor also needs the low order bits 2:0 of the gghist, but uses them after the predictions are accessed. With this scheme, if two groups of eight instructions are read from the instruction cache each cycle, then up to sixteen branch predictions may be made each cycle.

Together, gghist and contiguously stored branch predictions solve the difficult problems described previously. First, the identification of the conditional branches' locations in the predictor is no longer an issue. All branches in the two fetched groups are predicted simultaneously. The only remaining issue is that the speculative gghist update logic needs to know if there were any branch predictions in either phase at all. Second, the critical loop problem goes away because at most two new gghist bits are generated each cycle and these happen to be the least significant bits of the gghist. Therefore, in the preferred embodiment, these bits are not needed to index the predictor arrays, but rather are needed only after the array access.

Figure 3:
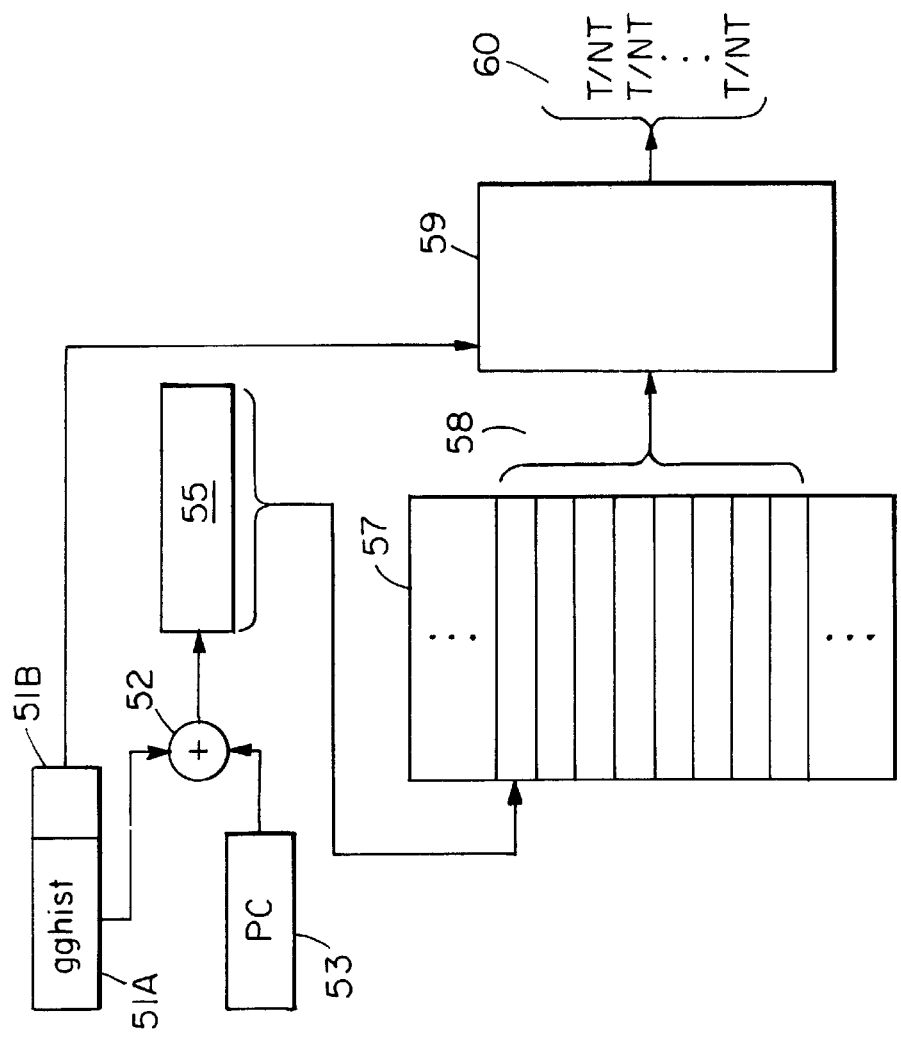
FIG. 3 is a schematic diagram illustrating a preferred embodiment of the present invention.

FIG. 3 is a schematic illustrating the gghist method of a preferred embodiment of the present invention. To enable multiple predictions without multiple read ports on the predictor array 57, branch predictions must be accessed in an order corresponding to the sequential order of the instructions. Thus it is necessary to base the predictor scheme, at least in some part, on the instruction address of the branch. This is preferably done by hashing the high-order bits of the gghist register 51A with the program counter 53 to produce a "gshare" type index 55 into a prediction array 57. In a preferred embodiment, the hashing function 52 is implemented by simply XORing the gghist register 51 with the program counter 53.

In a preferred embodiment, the gshare-type index 55 drops the three low-order bits. Because the address is incorporated into the index 55, eight sequential predictions are produced from the prediction array 57. The predictions are located in adjacent, or naturally aligned, locations within the array 57, but may be in random order. They are reordered by a shuffle network 59 which has as input the three least significant bits 51B of the gghist register 51. Without this manner of hashing the address with the history, portioning the index and shuffling the predictions, there could be no expectation that the eight predictions would be naturally aligned. Eight ports would thus be required to read the eight predictions, taking a heavy toll on chip resources.

Gghist prediction has some characteristics that are undesirable and must be dealt with. Among them, aliasing stands out. A bimodal predictor that accesses the predictor array with part of the PC is a well-behaved predictor. Each branch has its prediction stored in only one location in the table and aliasing in the predictor array has a direct relationship to aliasing in the instruction cache itself. On the other hand, global history in general is not so well-behaved. Because the index into the predictor array is a sequence of taken/not-taken branch results, each branch can have many predictions stored in the array. In addition, aliasing has nothing to do with a branch's PC. It occurs when dynamic occurrences of two branches have the same history pattern.

There are a number of ways to deal with these problems. The simplest is to associate the index with the PC, by hashing the global history with the PC as described above. Another way to deal with aliasing is best described by first discussing constructive and destructive interference.

Recall that a branch predictor only has two choices: taken and not-taken. If two branches in a global history predictor alias to the same location in the predictor array, there is a 50% chance that no harm will result. In fact, this aliasing might even be constructive when both predict the same direction; this is called constructive interference. Destructive interference is the opposite, mainly, when two branches alias to the same counter but the outcome of the branches are different. This is the case in which it is desirable to remove the aliasing.

Figure 4:
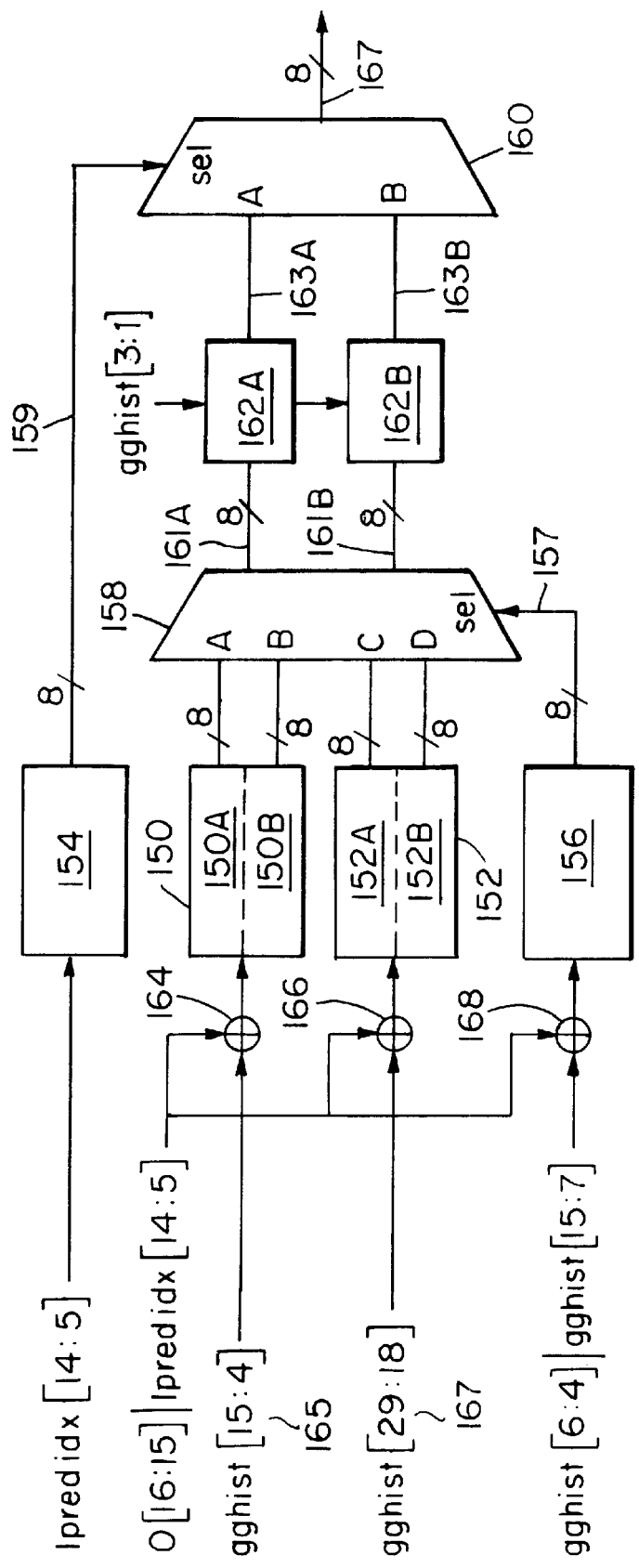
FIG. 4 is a block diagram of an implementation of the present invention, having eight branch predictions corresponding to one fetch group of instructions.

FIG. 4 is a high-level schematic of a preferred branch predictor. The importance of a very long global history in a predictor has been discussed previously. The size of a straight-forward predictor array is $2^n$ counters, where n is the number of bits in the global history. A number of techniques give the present invention predictor the qualities of such a straight-forward predictor. In a preferred embodiment, there are thirty stored bits of global history. Since the present invention predictor uses gghist prediction, the actual history remembered is potentially much greater than thirty bits.

The preferred embodiment has two global history arrays. One array 150 is indexed by newer history 165 comprising the more recent bits [15:4] of the history register, while the other array 152 is indexed by older history 167 comprising bits [29:18]. While using gghist bits to index array 152 which are different from those used to index array 150 is important, the actual choice of gghist bits used in indexing the second array 152 is arbitrary.

Enhancing the constructive interference and lessening the destructive interference is done by conceptually dividing each predictor array 150, 152 in half. One half 150A, 152A tends to predict mostly taken branches and the other half 150B, 152B tends to predict mostly not-taken branches.

A simple non-hysteretic chooser 156 selects, via selection signals 157 and selector 158, one of the two top half arrays 150A, 152A and one of the two bottom half arrays 150B, 152B. A concatenation of bits [6:4] of the history register with bits [15:7] of the history register is used to look up entries in the chooser 156.

Hashing functions 164, 166, 168, associated with arrays 150, 152 and chooser 156 respectively, hash the register bits with a concatenation of two zeroes (0[16:15]) and the PC bits [14:5].

The selected predictions 161A, 161B are then unshuffled by respective shuffle networks 162A, 162B, which uses the latest history bits [3:1] to reorder the predictions 161A, 161B. The unshuffled, or reordered, predictions are shown as 163A and 163B respectively.

A simple bimodal predictor 154, whose entries are referenced with part of the group's PC, provides selector signals 159 comprising a single bit per prediction, to an array-half selector 160, which selects the array half from which each unshuffled prediction is to be taken. Hysteresis in this predictor 154 significantly improves the prediction accuracy over a single bit predictor.

Michaud, Seznec and Uhlig, "Trading Conflict and Capacity Aliasing in Conditional Branch Predictors", Proceedings of the 24th Annual International Symposium on Computer Architecture, 1997, introduced a modification to the gshare predictor called "gskew". In theory, by hashing each bit of the index, capacity-type issues cause mispredictions. By limiting the number of index bits that are hashed, the actual number of predictor counters used per static branch is reduced, thus increasing the accuracy for the predictor.

Figure 5:
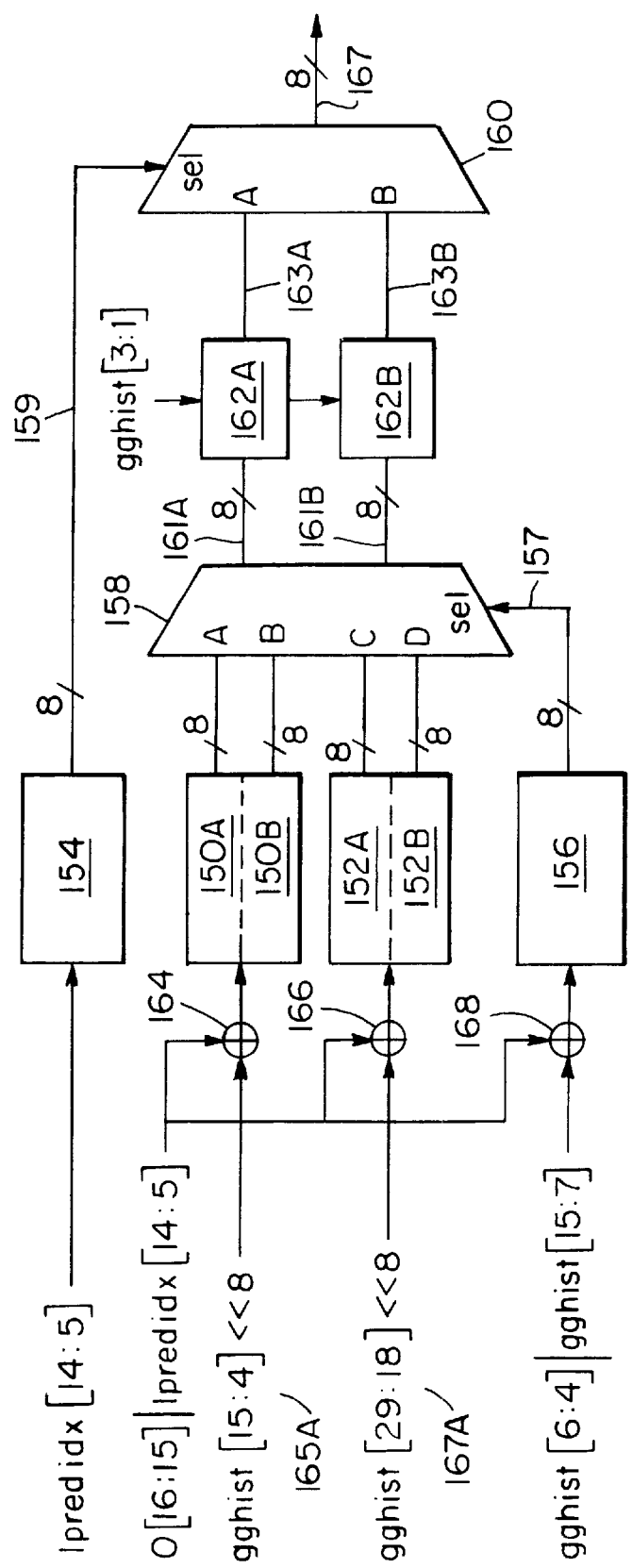
FIG. 5 is a block diagram of an implementation of the present invention, similar to that of FIG. 4, but additionally incorporating the gskew scheme.

As FIG. 5 shows, this limiting may be done by shifting the history register and leaving the least significant address bits unhashed. FIG. 5 is identical to FIG. 4 except that the gghist history bits 165A, 167A used to the index arrays 150, 152 respectively have been shifted left eight bits, indicated by "<<8". This leaves the eight least significant address bits unhashed.

This scheme usually works well, a notable exception being the SPECInt95 go.9stone21 program which prefers to have full gshare. However, even in go.9stone21 the reduction in accuracy is negligible. Gcc.2cp-decl actually has better performance with as many as 10 address bits left unhashed.

From a hardware perspective, an eight-bit unhashed index works well. This organization allows the indirect 154, gshare A 150, and gshare B 152 arrays to be in the same physical array because the index bits that form the word line decode and the bank select bits are the same. The latter is important when it comes to training, or writing, the array.

Figure 6A:
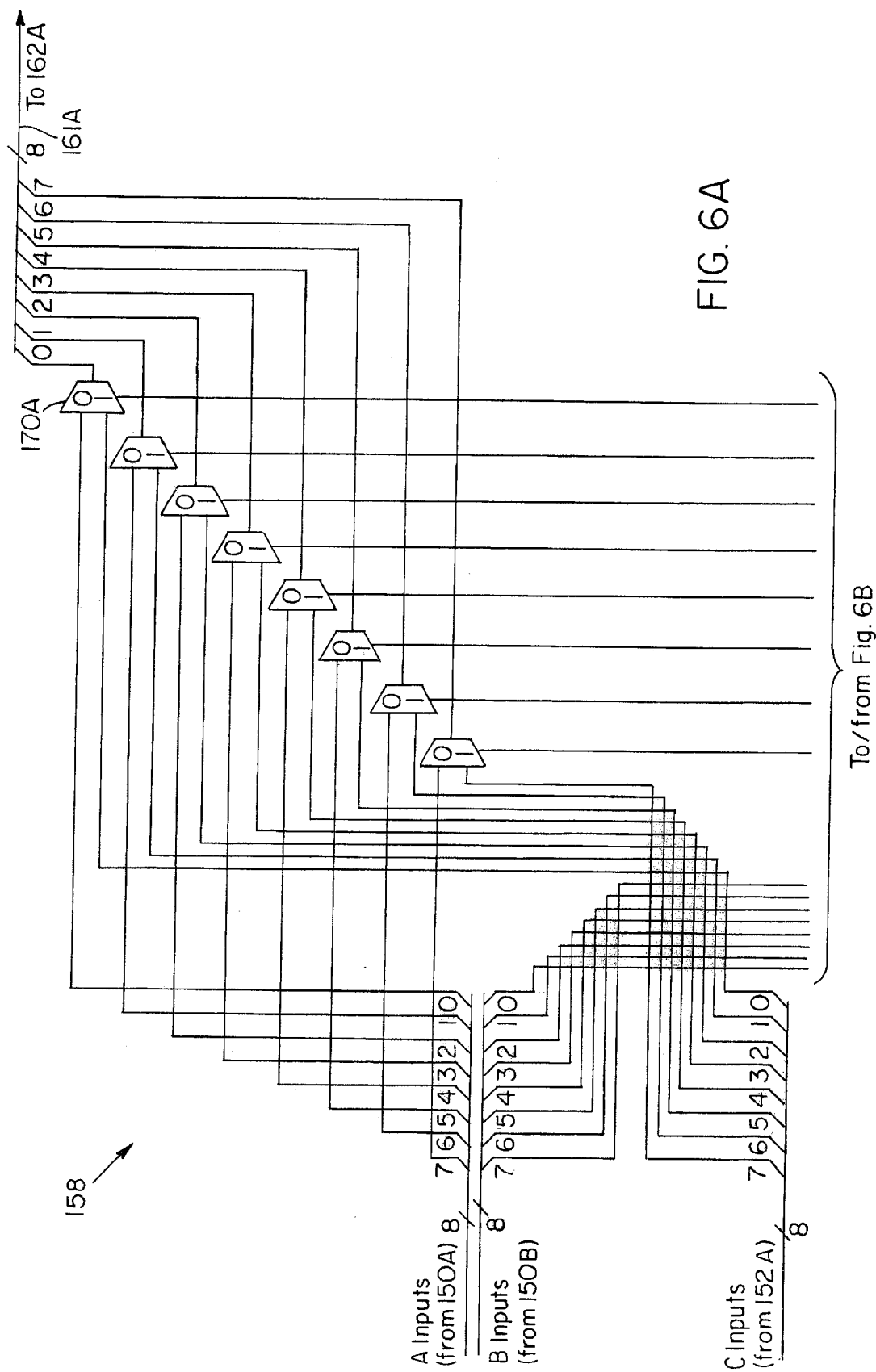
FIGS. 6A and 6B together are a schematic of the chooser selector of FIGS. 4 and 5.
Figure 6B:
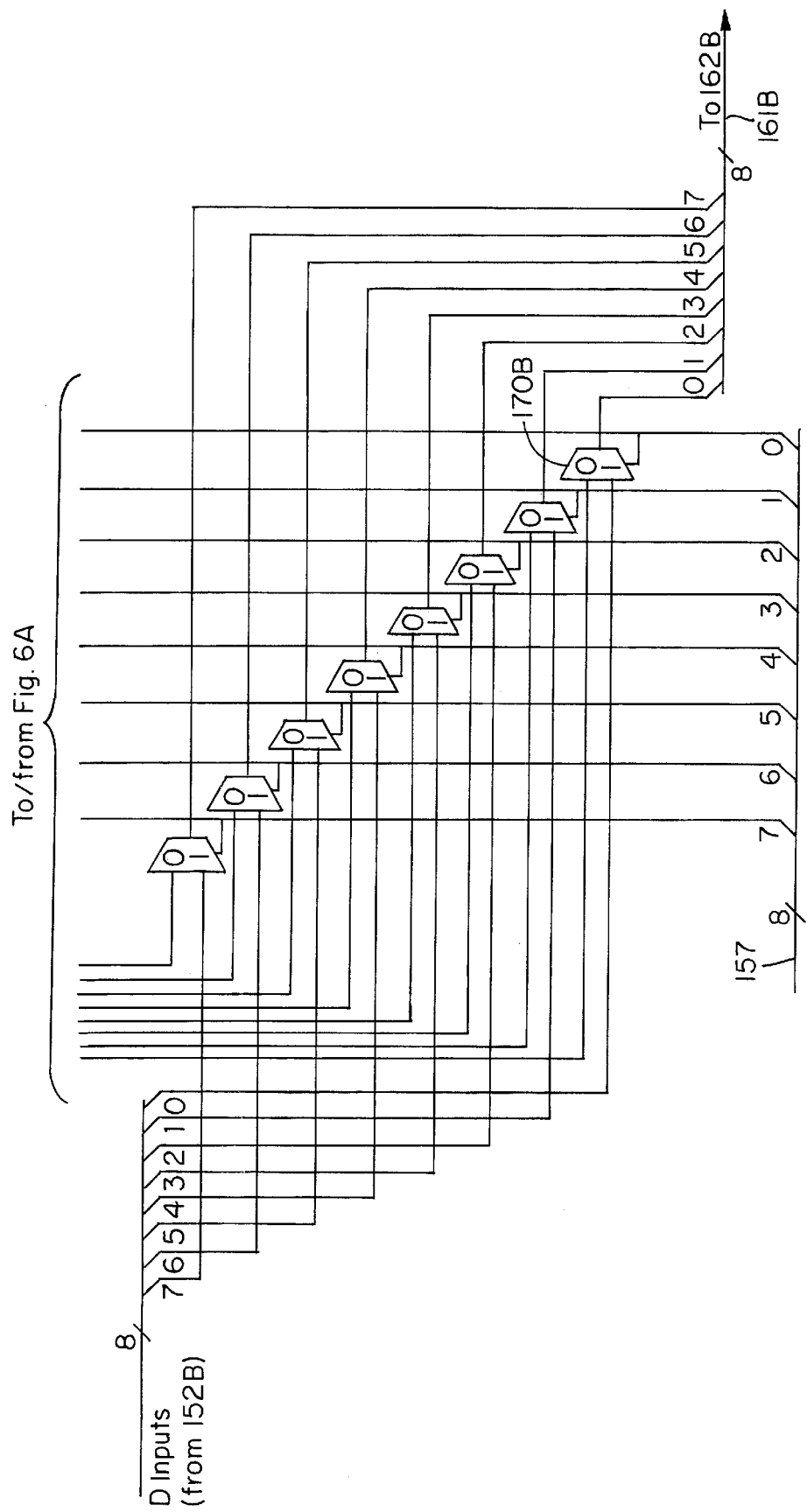

FIGS. 6A and 6B together are a schematic of the chooser selector 158 of FIGS. 4 and 5. A, B, C and D inputs come from array halves 150A, 150B, 152A and 152B respectively. Selection signals 157 come from the chooser 156. Each of the eight selection signals controls two multiplexors. For example, bit 0 of the selection signal 157 controls multiplexors 170A and 170B. Depending on the value of this bit 0, multiplexor 170A selects a prediction from bit 0 of either the A inputs (from 150A) or the C inputs (from 152A). Similarly, multiplexor 170B selects a prediction from bit 0 of either the B inputs (from 150B) or the D inputs (from 152B). The selected predictions are then output on lines 161A and 161B respectively.

Figure 7:
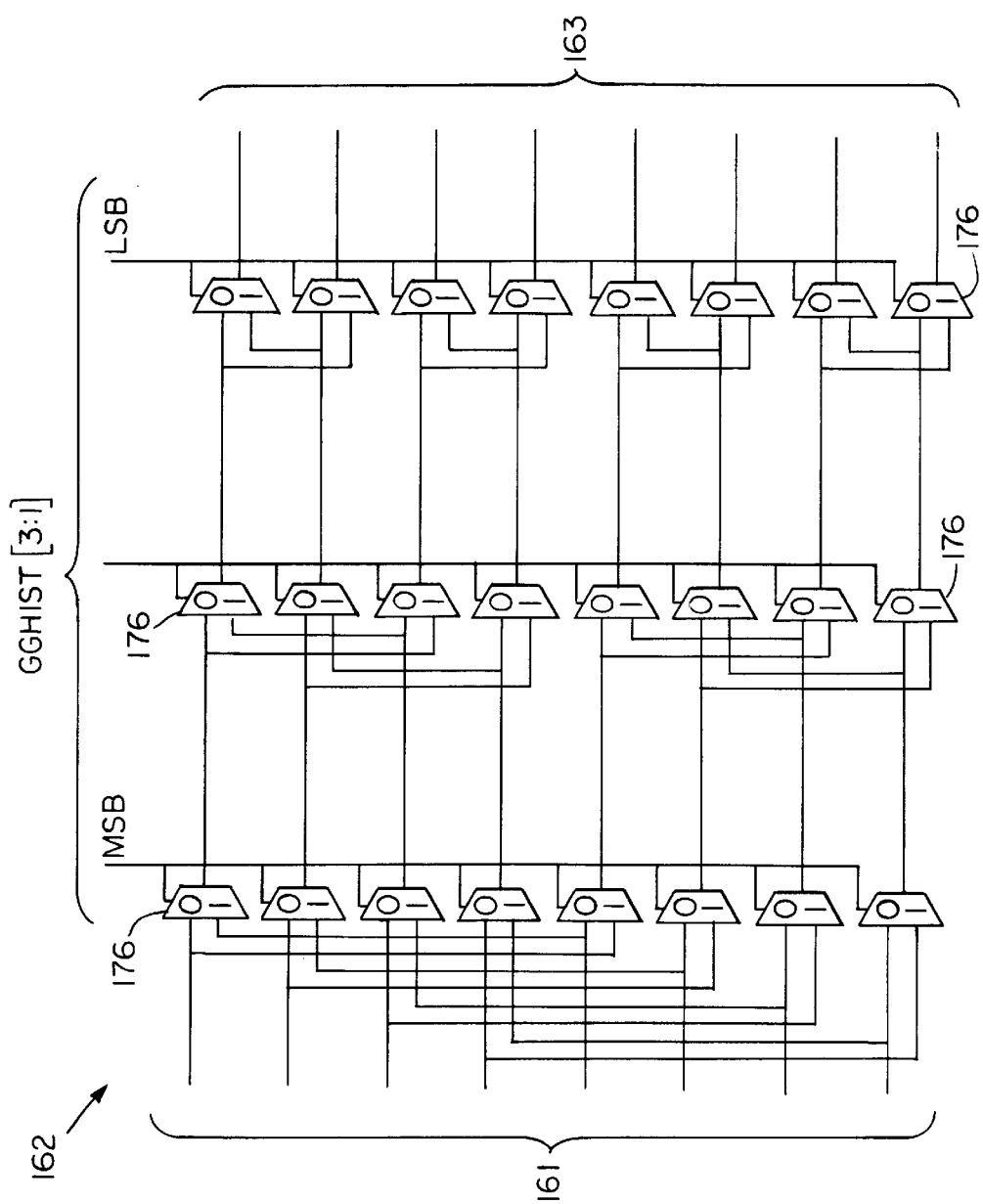
FIG. 7 is a schematic of a shuffle network as depicted in FIGS. 4 and 5.

FIG. 7 is a schematic of a shuffle network 162 which corresponds to either of the unshuffle networks 162A, 162B shown in FIGS. 4 and 5. The network 162 receives eight prediction bits 161 which are in a shuffled order and which correspond to either of the selected prediction sets 161A, 161B as selected by the chooser selector 158. Low-order history register bits [3:1] control multiplexors 176 to unshuffle the predictions into the correct order. The ordered predictions are shown as 163.

Figure 8:
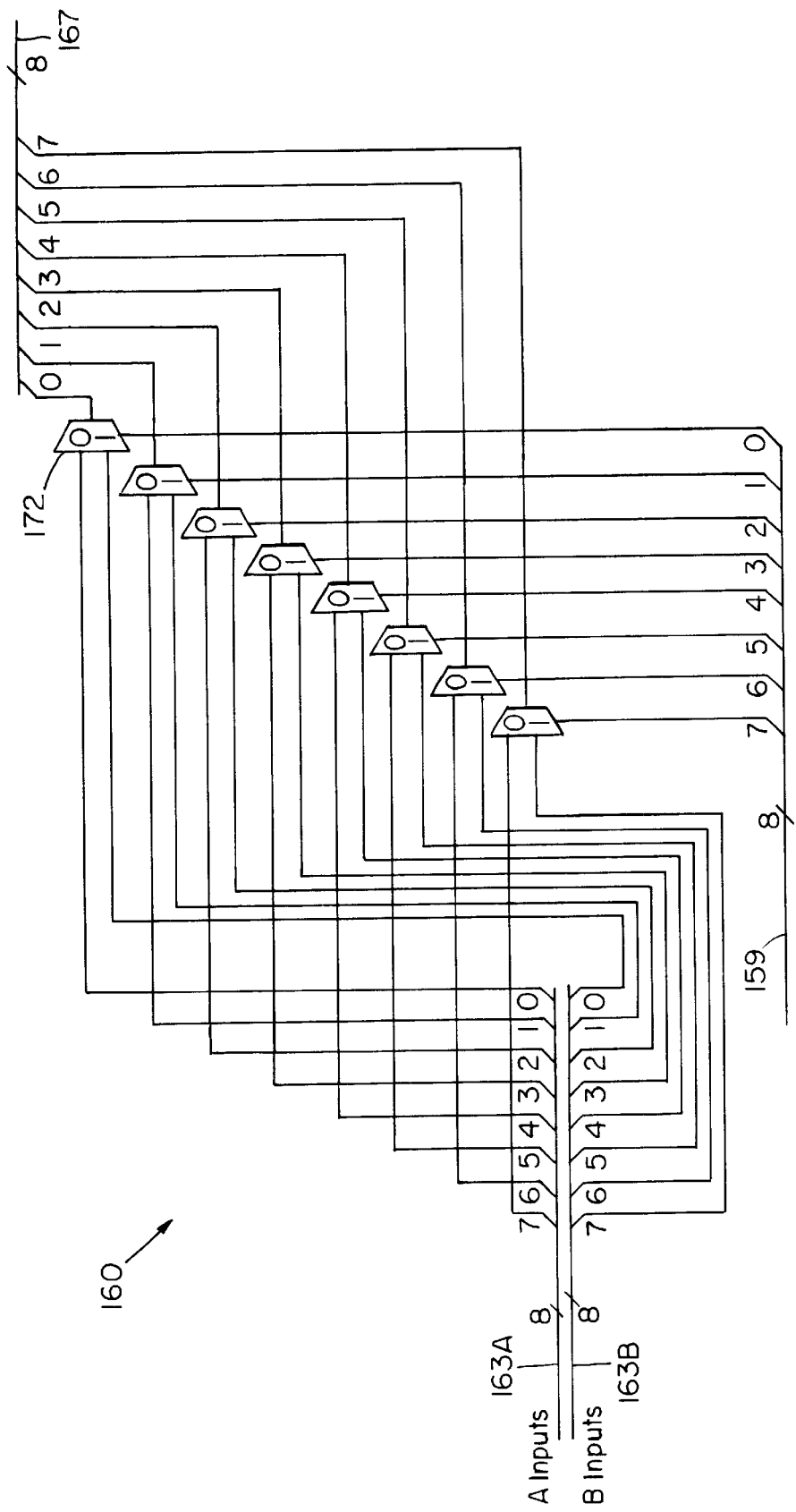
FIG. 8 is a schematic of the array half selector of FIGS. 4 and 5.

FIG. 8 is a schematic of the array-half selector 160 of FIGS. 4 and 5. A and B inputs derive, via the shuffle networks 162A and 162B respectively, from the top array halves 150A, 152A, and the bottom array halves 150B, 152B respectively, as selected by the chooser selector 158. The selection inputs 159 are provided by the bimodal predictor 154, and each selection input signal 159, for example bit 0, controls a multiplexor 172 which selects a prediction from the corresponding bit of either of the A inputs 163A or B inputs 163B. The eight bit output 167 from the array-half selector 160 form the eight ordered predictions which are used to predict the outcomes of the branch instructions in the group.

Figure 9:
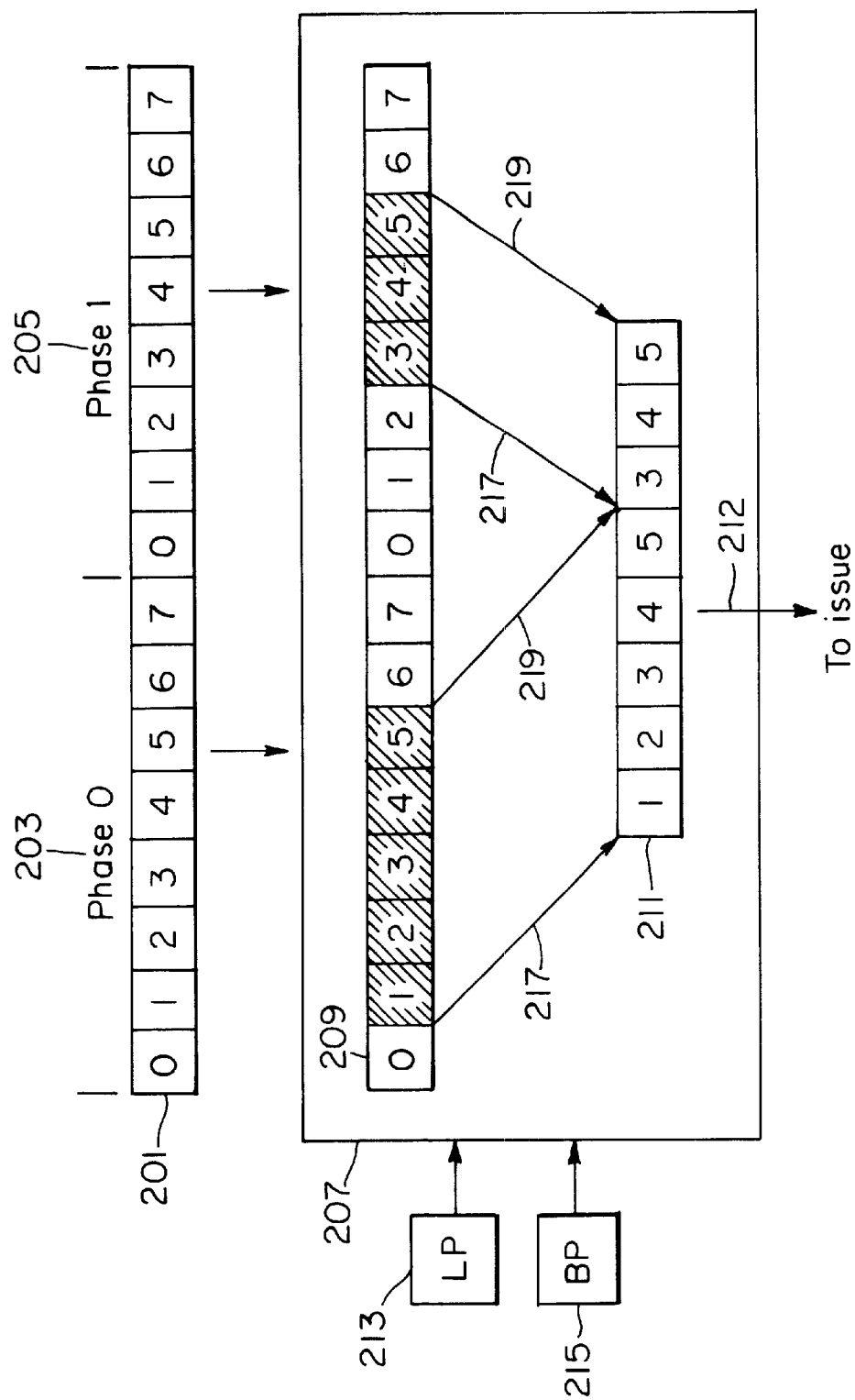
FIG. 9 is a schematic diagram illustrating a collapsing buffer.

FIG. 9 illustrates a collapsing buffer. Every cycle, the line predictor 213 predicts two indices with which to fetch two instruction blocks. In each phase 203, 205 of a cycle, a read from the instruction cache produces two groups of eight naturally aligned instructions for a total of sixteen instructions 201 per cycle. Since only eight instructions can be issued per cycle, it may first seem that more instructions have been fetched than can be used. One of the main functions of the IBox, however, is to maximize the number of good (non-badpath) instructions issued each cycle. The collapsing buffer 207 takes the two fetch groups 201 into an instruction buffer 209. In addition, the collapsing buffer 207 takes the line predictions 213 (to give the starting instruction position 217 within each group), and the branch predictions 215 or other control flow information (to give the ending instruction position 219 within the group) and merges the groups into the oldest eight instructions available into one buffer 211. If there are more than eight valid instruction remaining from the two fetch groups, they arc saved in the instruction buffer 209 for the next cycle's collapse.

Extensions to the preferred embodiment are straight-forward. For example, for each additional fetch to be executed in a given cycle, only one additional read port on the predictor structure is required, thus providing support for prediction across multiple basic blocks.

The particular selections as to which instructions belong to a group and which bits in the gghist register correspond to which branch are implementation details. The embodiments described above represent a few of many implementation choices, all of which work more or less equally well. For example, the function of the preferred embodiment records a 1 for the corresponding group if there is a taken conditional branch. Otherwise, a 0 is recorded. Another possible function, for example, is to record some bit, e.g., bit 2, of the program counter for that instruction if there is a taken conditional branch. Another possible function is to record an exclusive-or hash of several PC bits for a conditional branch that is taken. Yet another is to record a hash of the count of the number of conditional branches in the line preceding and including the taken conditional branch.

In general, any function of the PC of the conditional branches in a group, of their count, or order number or any other information that can be derived from the instructions in the group can be used. The important properties of the function are a) the result varies according to which branch, if any, is taken, and b) it is a result of the group as a whole in that if there are one or more conditional branches in the group, N bits (N is usually 1, but N>1 is possible) are produced regardless of the number of conditional branches.

For example, one might believe that more useful information is being recorded than when there is more than one branch and choose to record N=2 bits per instruction group. An example is to add two bits and have the two bits be the number of the branch that is taken modulo 4. If no branch is taken, the result is defined to be 0. If the first branch in the group were taken, the result would be 1. For the second branch taken, the result would be 2, for the third branch taken, 3, and for the fourth branch taken it would be 0 again since 4 modulo 4 is 0.

Another implementation choice is whether a fetch group with no conditional branches generates history bits or not. One alternative to the preferred embodiment discussed previously is to assign a particular result, e.g., 0, to such a group. This may work almost as well as the preferred embodiment, and may make other aspects of the embodiment easier to implement.

The key point in constructing a group global history is that the history recorded for a group of instructions does not depend on the number of conditional branches beyond the first conditional branch. A fixed number of history bits are recorded for each group containing a conditional branch, or optionally, for each group regardless of whether it contains a conditional branch. Some function is then applied to the history, producing a result that varies according to which, if any, conditional branch within the group was taken.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system for predicting branch outcome, comprising:
 a register which provides a pattern of program control flow, wherein the register is modified based on a summary of control flow activity of a group of instructions fetched in a given slot;
 a hash function which generates an index, by hashing the register's value with the group's program counter (PC) where outcomes of branch instructions within the group are to be predicted;
 an array of branch predictions, which, when referenced by the generated index, provides naturally aligned branch predictions; and
 a shuffler for reordering the provided branch predictions based on a portion of the register, into the same order as instructions.

2. The system of claim 1 wherein the register is modified based on whether a branch after an entry point is taken.

3. The system of claim 1 wherein instructions are fetched in groups of eight instructions, and three least significant bits of a branch instruction's target PC indicate an entry point, and the shuffler uses the three least significant bits of the register to reorder the branch predictions.

4. A system for predicting branch outcome where a group of instructions is fetched per slot, comprising:
 a register indicative of recent program control flow;
 a predictor table, further comprising a plurality of saturating counters, a particular counter being updated when a branch is encountered, each group of instructions being associated with a program counter (PC), a saturating counter being referenced by hashing the register with the group's PC;
 a hash function for generating an index from the register and the group's PC, wherein the index is used to access naturally aligned predictions in the predictor table; and
 a shuffler for reordering the predictions based on value of the lower portion of the register.

5. The system of claim 4 wherein instructions are fetched in groups of eight instructions.

6. The system of claim 4 wherein the register is maintained by shifting in a 1 if a branch in a corresponding group is taken, or a 0 if no branch in the corresponding group is taken.

7. The system of claim 6, wherein a bit corresponding to a fetched group of instructions is shifted into the register only if there is at least one branch instruction in the fetched group.

8. The system of claim 4 wherein the hash function comprises XORing the register with the group's PC.

9. The system of claim 4 wherein
a saturating counter is incremented when a corresponding branch is taken, but not beyond a maximum value, the saturating counter being referenced by a hash of the register and the group's PC, and
the saturating counter is decremented when the corresponding branch is not taken, but not below zero.

10. The system of claim 4 wherein a most significant bit of a saturation counter determines a prediction.

11. A system for predicting branch outcome where a group of instructions is fetched per slot, comprising:
register means for indicating recent program control flow;
a plurality of prediction means, a particular prediction means being updated when a branch is encountered, each branch instruction being associated with a program counter (PC), the prediction means being referenced by hashing the register means with the group's PC;
hashing means for generating an index from the register means and the group's PC, wherein the index is used to access naturally aligned prediction means; and
shuffling means for reordering the predictions based on value of the lower portion of the register means.

12. A method of branch prediction comprising:
using a pattern of control flow to reference a block of predictions, each prediction of the block of predictions corresponding to an instruction from a block of fetched instructions; and
for a branch instruction within the block of fetched instructions, selecting a corresponding prediction from the referenced block of predictions.

13. The method of claim 12 wherein the pattern is of control flow activity summaries, each summary being for activity within a block of fetched instructions.

14. A method of branch prediction comprising:
for a branch instruction, based on a pattern of control flow activity summaries, selecting a prediction from a plurality of predictions, each control flow activity summary being for activity within a block of fetched instructions.

15. A method of branch prediction, comprising the steps of:
maintaining a register which provides a pattern of program control flow;
modifying the register based on control flow activity;
hashing a value held in the resister with a program counter (PC) of an instruction fetched in a given slot to generate an index;
applying the index to access naturally aligned branch predictions which correspond to the given slot of instructions; and
reordering the branch predictions based on a portion of the register, into the same order as the instructions.

16. A method of branch prediction, comprising the steps of:
maintaining a register which provides a pattern of program control flow;
modifying the register based on a summary of control flow activity of instructions fetched in a given slot;
generating an index based on the register; and
using the index to select a branch prediction from a plurality of branch predictions.

17. The method of claim 16, further comprising:
hashing the register's value with a program counter (PC) of an instruction fetched in the slot to generate the index, an outcome of a branch instruction fetched within the slot to be predicted;
applying the index to access naturally aligned branch predictions; and
selecting the branch predictions based on a portion of the register, into the same order as the instructions.

18. The method of claim 17 wherein modifying the register is based on whether, after an entry point, a branch instruction fetched in the slot was taken.

19. The method of claim 17 wherein instructions are fetched in blocks of eight instructions, and three least significant bits of the target PC indicate an entry point.

20. A method of branch prediction, comprising the steps of:
fetching a block of instructions in a given slot;
maintaining a register indicative of recent program control flow;
maintaining a predictor table comprising a plurality of branch predictions, a particular prediction being updated when a branch is encountered, each instruction block being associated with a program counter (PC), the prediction being referenced by hashing the register with the PC of the instruction block;
hashing the register with the PC of the fetched instruction block to form an index;
accessing, with the index, naturally aligned predictions in the predictor table; and
reordering the predictions based on value of a portion of the register.

21. The method of claim 20 wherein each branch prediction comprises a saturating counter.

22. The method of claim 20 wherein instructions are fetched in blocks of eight instructions.

23. The method of claim 20 wherein the register is maintained by shifting in a 1 if a branch in the corresponding block is taken, or a 0 if no branch in the corresponding block is taken.

24. The method of claim 20 wherein hashing the register with the PC of the branch instruction further comprises XORing the register with the PC of the branch instruction.

25. The method of claim 20 further comprising:
incrementing a counter when a corresponding branch is taken, but not beyond a maximum value, the counter being referenced by a hash of the register and the fetched instruction block's PC; and
decrementing the counter when the corresponding branch is not taken, but not below zero.

26. The method of claim 20 further comprising using a most significant bit of a counter to determine prediction.

* * * * *